United States Patent
Oyoshi (10) Patent No.: US 8,254,800 B2
(45) Date of Patent: Aug. 28, 2012

(54) IMAGE PROCESSING APPARATUS HAVING A FUNCTION OF DETECTING A LIVING BODY AND METHOD OF CONTROLLING THE SAME

(75) Inventor: Kazuhiro Oyoshi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 315 days.

(21) Appl. No.: 12/636,628

(22) Filed: Dec. 11, 2009

(65) Prior Publication Data

US 2010/0150600 A1    Jun. 17, 2010

(30) Foreign Application Priority Data

Dec. 17, 2008    (JP) ................ 2008-321648

(51) Int. Cl.
*G03G 15/00*    (2006.01)
(52) U.S. Cl. ........................................ 399/79
(58) Field of Classification Search ............ 399/79, 399/75, 80
See application file for complete search history.

(56) References Cited

U.S. PATENT DOCUMENTS

2005/0257628 A1 * 11/2005 Nikaido et al. .......... 73/862.541

FOREIGN PATENT DOCUMENTS

| JP | 04081774 A | * | 3/1992 |
| JP | 07-114308 A | | 5/1995 |
| JP | 09006189 A | * | 1/1997 |
| JP | 09160440 A | * | 6/1997 |
| JP | 09160441 A | * | 6/1997 |
| JP | 09160446 A | * | 6/1997 |

OTHER PUBLICATIONS

Translation of JP07-114308a; May 1995.*

* cited by examiner

*Primary Examiner* — Quana M Grainger
(74) *Attorney, Agent, or Firm* — Canon U.S.A., Inc. IP Division (57) ABSTRACT

An image processing apparatus includes a living body detection unit configured to detect approaching of a living body based on a detection output depending on a distance to the living body, an operation unit configured to receive an operation command from a user, a history recording unit configured to record a history of a detection output of the living body detection unit and a history of an operation performed on the operation unit, and a determination unit configured to determine a threshold value of the detection output, the threshold value being used by the living body detection unit as a determination reference value in determining whether a living body is detected, the determination of the threshold value being made based on the history recorded in the history recording unit as to the detection output of the living body detection unit and as to the operation performed on the operation unit.

9 Claims, 13 Drawing Sheets

| TIME | SENSED VALUE |
|---|---|
| 8:10:00 | 0 |
| 8:10:01 | 0 |
| 8:10:02 | 0 |
| 8:10:03 | 0 |
| 8:10:04 | 0 |
| 8:10:05 | 0 |
| 8:10:06 | 10 |
| 8:10:07 | 20 |
| 8:10:08 | 30 |
| 8:10:09 | 40 |
| 8:10:10 | 50 |
| 8:10:11 | 60 |
| 8:10:12 | 50 |
| 8:10:13 | 40 |
| 8:10:14 | 30 |
| 8:10:15 | 20 |
| 8:10:16 | 1 |
| 8:10:17 | 0 |
| 8:10:18 | 0 |
| 8:10:19 | 0 |
| 8:10:20 | 0 |
| ⋮ | ⋮ |

FIG. 13A

| TIME | SENSED VALUE | OPERATION |
|---|---|---|
| 8:10:00 | 0 | NONE |
| 8:10:01 | 0 | NONE |
| 8:10:02 | 0 | NONE |
| 8:10:03 | 0 | NONE |
| 8:10:04 | 0 | NONE |
| 8:10:05 | 0 | NONE |
| 8:10:06 | 10 | NONE |
| 8:10:07 | 20 | NONE |
| 8:10:08 | 30 | NONE |
| 8:10:09 | 40 | NONE |
| 8:10:10 | 50 | NONE |
| 8:10:11 | 60 | NONE |
| 8:10:12 | 50 | NONE |
| 8:10:13 | 40 | NONE |
| 8:10:14 | 30 | NONE |
| 8:10:15 | 20 | NONE |
| 8:10:16 | 1 | NONE |
| 8:10:17 | 0 | NONE |
| 8:10:18 | 0 | NONE |
| 8:10:19 | 0 | NONE |
| 8:10:20 | 0 | NONE |
| ⋮ | ⋮ | ⋮ |

FIG. 13B

| TIME | SENSED VALUE | OPERATION |
|---|---|---|
| 8:10:00 | 0 | NONE |
| 8:10:01 | 0 | NONE |
| 8:10:02 | 10 | NONE |
| 8:10:03 | 20 | NONE |
| 8:10:04 | 40 | NONE |
| 8:10:05 | 80 | NONE |
| 8:10:06 | 100 | NONE |
| 8:10:07 | 100 | NONE |
| 8:10:08 | 100 | PERFORMED |
| 8:10:09 | 100 | PERFORMED |
| 8:10:10 | 100 | PERFORMED |
| 8:10:11 | 100 | PERFORMED |
| 8:10:12 | 100 | PERFORMED |
| 8:10:13 | 100 | NONE |
| 8:10:14 | 100 | NONE |
| 8:10:15 | 80 | NONE |
| 8:10:16 | 60 | NONE |
| 8:10:17 | 40 | NONE |
| 8:10:18 | 20 | NONE |
| 8:10:19 | 10 | NONE |
| 8:10:20 | 0 | NONE |
| 8:10:21 | 0 | NONE |
| 8:10:22 | 0 | NONE |
| 8:10:23 | 0 | NONE |
| 8:10:24 | 0 | NONE |

IMAGE PROCESSING APPARATUS HAVING A FUNCTION OF DETECTING A LIVING BODY AND METHOD OF CONTROLLING THE SAME

BACKGROUND OF THE INVENTION

1. Field of the Invention

The present invention relates to an image processing apparatus having a function of detecting a living body and a method of controlling an image processing apparatus.

2. Description of the Related Art

An image processing apparatus is available that has a human body detection sensor and that is capable of switching from a power saving mode into a normal mode in response to a detection performed by the human body detection sensor. However, if an erroneous detection is performed by the human body detection sensor, erroneous switching from the power saving mode is performed even though the image processing apparatus is not going to be used, and thus wasteful consumption of electric power occurs. To avoid such a problem, it is known to configure the human body detection sensor so as to have a variable directivity (see, for example, Japanese Patent Laid-Open No. 07-114308).

However, in the technique disclosed in Japanese Patent Laid-Open No. 07-114308, to realize the variable directivity of the sensor, an additional mechanism is necessary to vary the orientation of the sensor, which results in an increase in cost. Besides, a user has to perform an adjustment in terms of the orientation of the sensor. This is troublesome to the user. Besides, there is a possibility that the adjustment is performed improperly which can produce a possibility that a human body is not correctly detected and an erroneous detection of a human body can cause erroneous switching from the power saving mode into the normal mode.

SUMMARY OF THE INVENTION

According to an aspect of the present invention, an image processing apparatus includes a living body detection unit configured to detect approaching of a living body based on a detection output depending on a distance to the living body, an operation unit configured to receive an operation command from a user, a history recording unit configured to record a history of a detection output of the living body detection unit and a history of an operation performed on the operation unit, and a determination unit configured to determine a threshold value of the detection output, the threshold value being used by the living body detection unit as a determination reference value in determining whether a living body is detected, the determination of the threshold value being made based on the history recorded in the history recording unit as to the detection output of the living body detection unit and as to the operation performed on the operation unit.

Further features of the present invention will become apparent from the following description of exemplary embodiments with reference to the attached drawings.

DESCRIPTION OF THE EMBODIMENTS

First Embodiment

The present invention is described in further detail below with reference to exemplary embodiments in conjunction with the accompanying drawings.

External Appearance of MFP

Figure 1:
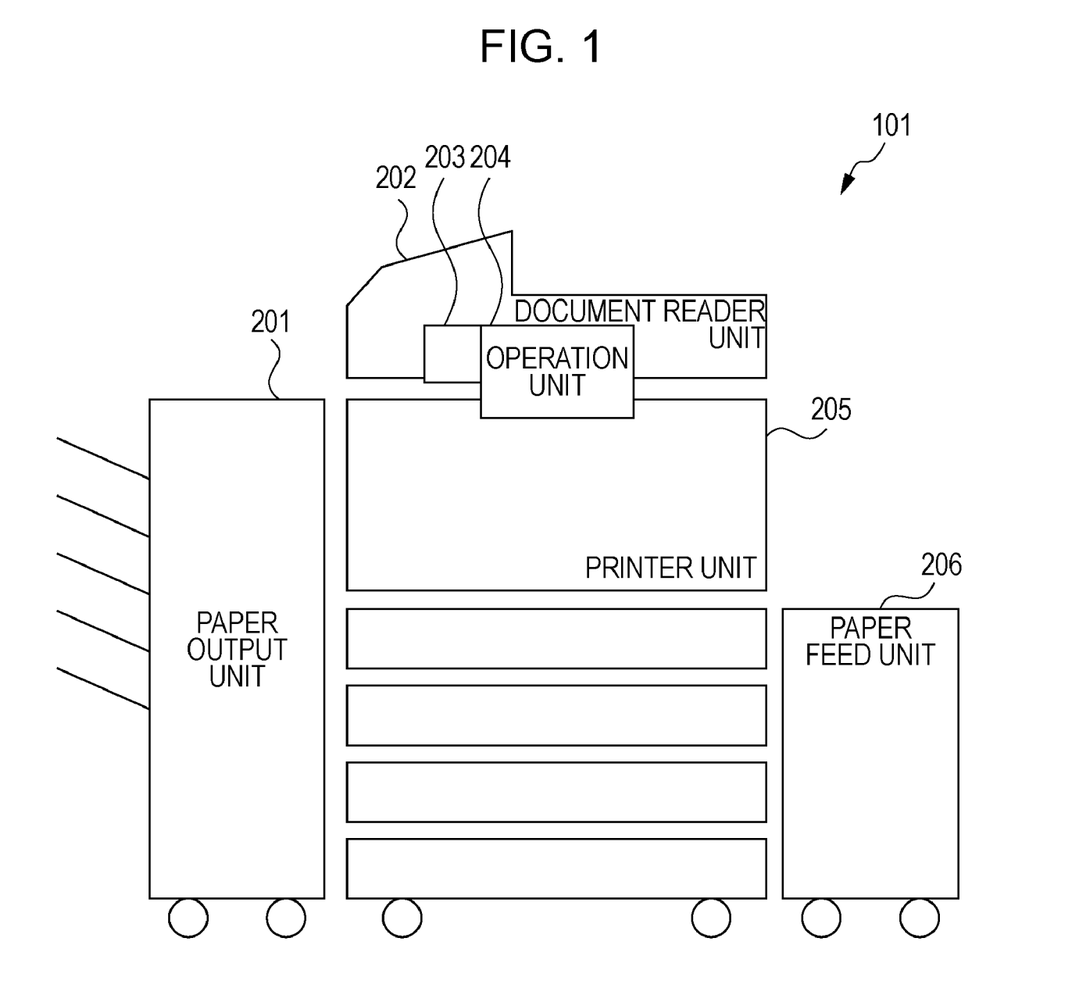
FIG. 1 is a diagram illustrating an example of an external appearance of an image processing apparatus.

FIG. 1 illustrates an example of an external appearance of a multi function peripheral (MFP), which is an example of an image processing apparatus according to an embodiment of the present invention.

More specifically, the MFP 101 is an image forming apparatus having a plurality of functions such as a copying function, a scanning function, a facsimile function, a printing function, etc.

A document reader unit 202 optically reads a document and produces image data of the document. A paper feed unit 206 is a unit configured to store paper and feed paper therefrom. A user is allowed to replenish paper in the paper feed unit 206 as required. A printer unit 205 is a unit configured to print an image on paper. In the printing operation performed by the printer unit 205, a toner image is formed on paper fed from the paper feed unit 206 and the toner image is fixed by a fixing unit. The resultant printed paper is transferred to a paper output unit 201. An operation unit 204 includes buttons used by a user to input commands to the apparatus and a display, such as a liquid crystal display, configured to display a status of the apparatus, an operation menu, and other information. The operation unit 204 may be configured using a touch panel. When an operation command is issued by a user, the operation command is received via the operation unit 204. A card reader unit 203 is a unit configured to read information stored in an ID card of a user. The card reader unit 203 may also have a function of writing data in a card.

In the present embodiment, the operation unit 204 also includes a human body detection unit 510, which will be described later.

Hardware Configuration of MFP 101.

Figure 2:
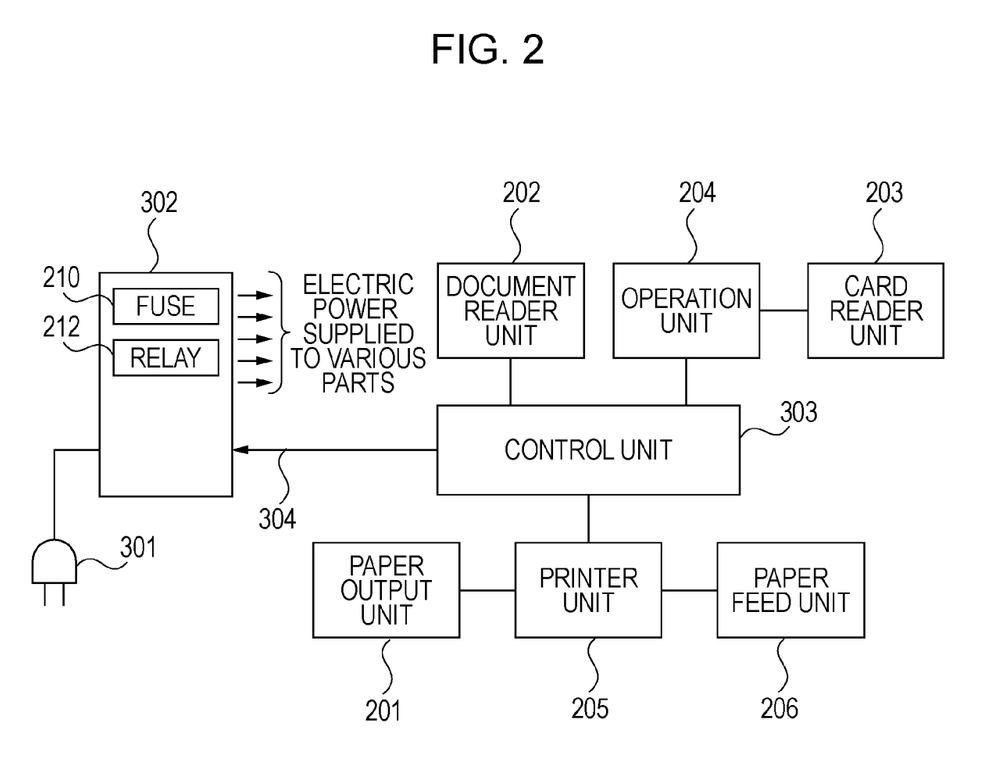
FIG. 2 is a block diagram illustrating an example of an internal hardware configuration of an image processing apparatus.

FIG. 2 is a block diagram illustrating an example of a hardware configuration in the MFP 101. A plug 301 is configured to be inserted in an outlet connected to a commercial AC power line to supply AC power to a power supply unit 302. The power supply unit 302 is configured to supply electric power to units in the apparatus. In the supplying of the electric power, the power supply unit 302 converts a voltage of the AC power supplied from the commercial AC power source into a voltage suitable for each unit. Depending on the units to which electric power is supplied, the AC power may be converted into DC form. The power supply unit 302 includes a fuse 210 and a relay 212 disposed inside the power supply unit 302. When an over current or a short circuit current occurs in the power supply unit 302, a fusible element in the fuse 210 blows or is cut off thereby protecting the power supply unit 302 and the units in the MFP 101 to which electric power is supplied from the power supply unit 302. The relay 212 operates as a switch to connect or disconnect the power supply unit 302 to/from the units in the MFP 101 so that electric power is or is not supplied to the units. The fuse 210 and the relay 212 both have a life depending on the number of times that electric power is turned on. A control unit 303 is a unit configured to control the units in the MFP 101. Processing or transferring of electronic data is performed under the control of the control unit 303. A power control signal line 304 is a signal line over which a power control signal generated by the control unit 303 is transmitted to control turning-on/off of the output of the power supply unit 302.

The MFP 101 has a normal mode and an energy saving mode (also called a power saving mode or a sleep mode). In the normal mode, electric power is supplied to the respective units in the MFP 101. In contrast, in the energy saving mode, electric power is not supplied to particular units to reduce power consumption.

In the MFP 101 according to the present embodiment, electric power is not supplied in the energy saving mode to the document reader unit 202, the paper output unit 201, the printer unit 205, and the paper feed unit 206 to reduce power consumption. As for the control unit 303 and the operation unit 204, electric power is supplied to only particular parts thereof, but electric power to the other parts is cut off. More specifically, among parts in the control unit 303, electric power is supplied in the energy saving mode only to a circuit part configured to detect a trigger that causes the power mode to switch from the energy saving mode into the normal mode. The trigger can be, for example, a detection of insertion of an ID card, a detection of a reception of a facsimile signal, a detection of a print job received via a network, a detection of an operation of a button disposed on the operation unit 204, etc.

When the MFP 101 is in the energy saving mode, it is more convenient to a user if it is possible to switch, in as short a time as possible, the operation unit 204 into a usable state in which the user is allowed to insert an ID card and press buttons on the operation unit 204. However, depending on software or hardware that controls the operation unit 204, it can take a long time, such as a few seconds to a few tens of seconds, for the operation unit 204 to become ready for use. In addition, the operational lives of the relay, the fuse, and the HDD are limited depending on the number of times that electric power is turned on. In a shortest case, the operational life is reached when electric power has been turned on a few ten thousand times. In the case of the relay, the operational life thereof is determined by a life of its contact. In the case of the HDD, the operational life thereof is determined by accumulation of mechanical stress imposed on a storage medium or a head. In the case of the fuse, the operational life thereof is determined by degradation of the fusible element due to an inrush current that occurs each time electric power is turned on. Thus, the operational lives of the components described above limits the maximum number of times that switching is performed between the energy saving mode and the normal mode. For the above reason, it may be advantageous to minimize the number of times the switching is performed. Note that the relay is used in the power supply unit 302.

Hardware Configuration of Control Unit

Figure 3:
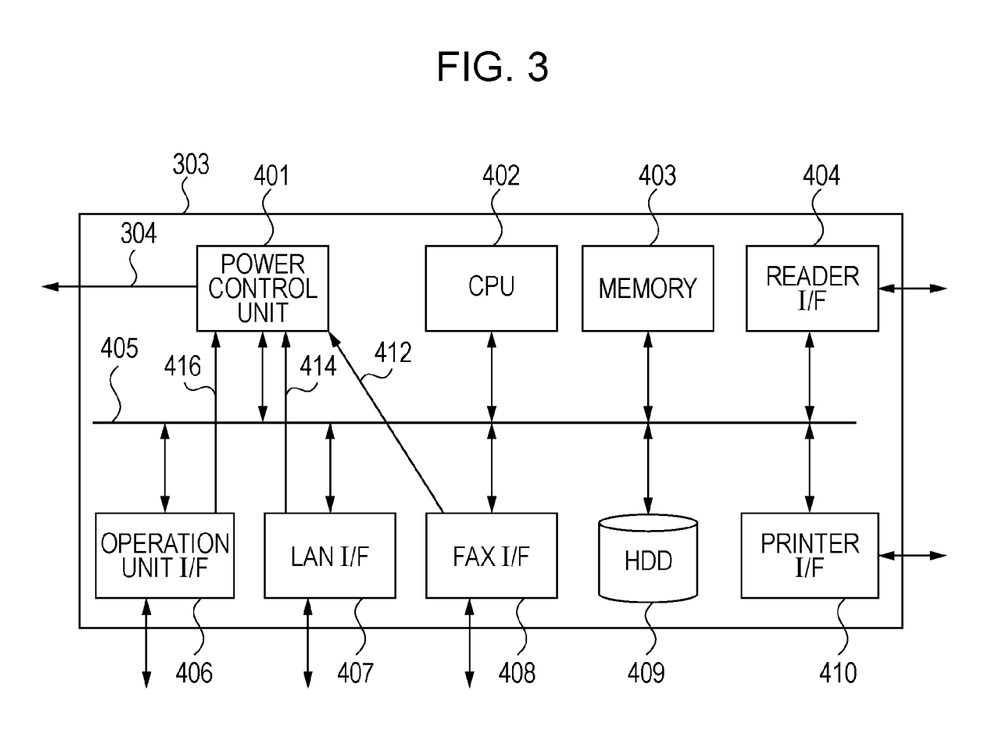
FIG. 3 is a block diagram illustrating an example of an internal hardware configuration of a control unit.

FIG. 3 is a block diagram illustrating an example of a hardware configuration of the control unit 303.

A CPU 402 performs processing in the control unit 303 by executing a program loaded in a memory/storage medium 403.

An internal bus 405 is a bus via which the CPU 402 is allowed to communicate with blocks in the control unit 303.

A hard disk (HDD) 409 is configured to store a program (such as an operating system (OS) or an application program) executed by the CPU 402. The HDD 409 also stores job data, image data, etc. The job data refers to data according to which the MFP 101 performs its function. An example of job data is PDL data that is received from a client PC 102 or 103 via a LAN interface 407 and that is used in a printing process. Note that the HDD 409 is merely an example of a device having an operational life depending on the number of times electric power is turned on, and other devices can also have operational lives depending on the number of times electric power is turned on.

A reader interface 404 is an interface for communicating with the document reader unit 202 to transmit/receive a command/status or image data. A printer interface 410 is an interface for communicating with the printer unit 205 to transmit/receive a command/status or image data. A facsimile (FAX) interface 408 is an interface connected to a public telephone line to transmit/receive a facsimile image. A LAN interface 407 is connected to a network such as an Ethernet (registered trademark) network to transmit/receive job data or command/status.

An operation unit interface 406 is an interface for communicating with the operation unit 204 to transmit data to be displayed on the display unit 504 and to receive information input by a user by pressing a button or a touch panel. A power supply control unit 401 is a block that controls switching of the mode of the MFP 101 between the normal mode and the energy saving mode. More specifically, in accordance with a command received from the CPU 402, the power supply control unit 401 generates or changes a power control signal transmitted to the power supply unit 302 via the power control signal line 304 to switch the mode from the normal mode to the energy saving mode. In the energy saving mode, the power supply control unit 401 monitors an activation signal transmitted from the operation unit interface 406, the LAN interface 407, or the facsimile interface 408 via an activation signal line (412, 414, or 416). If the power supply control unit 401 detects a change in the activation signal, the power supply control unit 401 generates or changes the power control signal to return the mode into the normal mode from the energy saving mode. In accordance with the power control signal, the power supply unit 302 starts or stops supplying of electric power to units in the MFP 101.

Hardware Configuration of Operation Unit

To a user of the MFP 101, it is convenient to return the mode of the MFP 101 to the normal mode from the energy saving mode as quickly as possible. In view of the above, a human body detection unit (also called a living body detection unit) may be provided in the MFP 101 whereby a user approaching the MFP 101 is detected and the mode is returned to the normal mode. This allows an apparent reduction in a return time to the normal mode from the energy saving mode. In the present embodiment, it is assumed that the human body detection unit is disposed on the operation unit 204 of the MFP 101.

Figure 4:
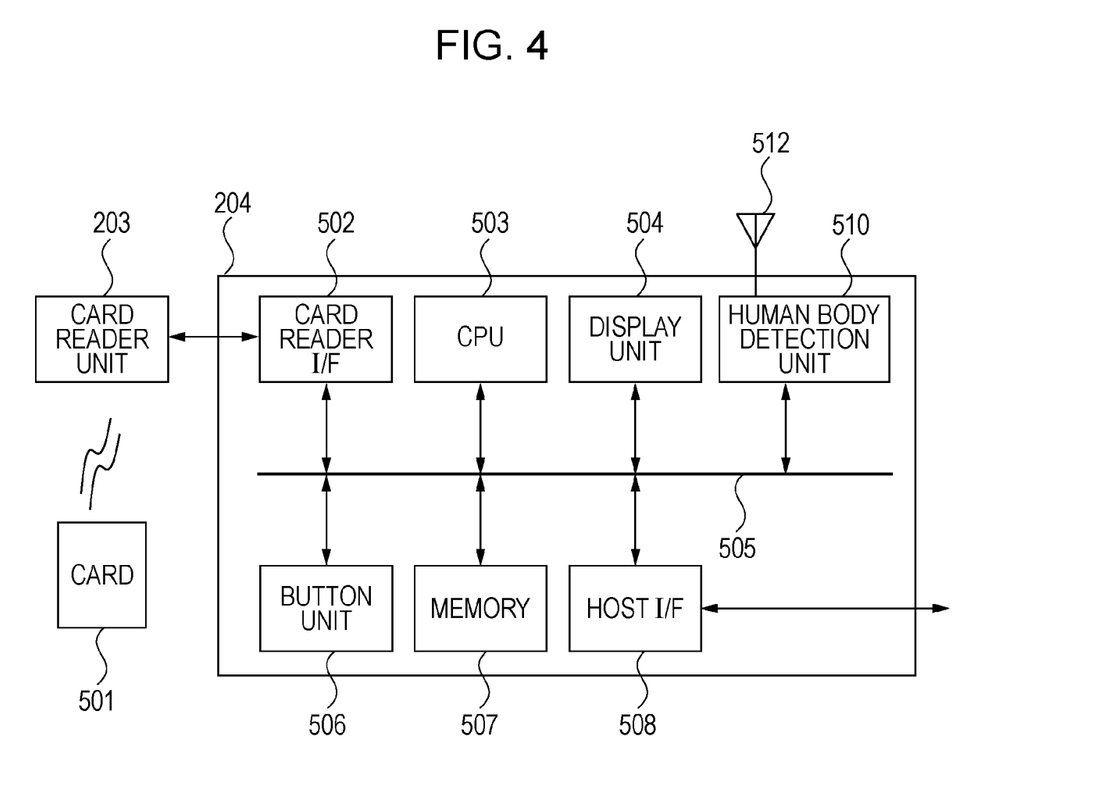
FIG. 4 is a block diagram illustrating an example of a hardware configuration of an operation unit.

FIG. 4 is a block diagram illustrating an example of a hardware configuration of the operation unit 204. A CPU 503 controls the whole operation unit 204 by executing a program using a memory 507 as a work area.

The memory 507 is a storage unit including a nonvolatile program memory and a writable temporary memory. The program memory stores a program executed by the CPU 503. The writable temporary memory is used by the CPU 503 as a work area.

A display unit 504 is configured to display data received from the control unit 303 via a host interface 508. More specifically, the data is displayed on a liquid crystal display (LCD) disposed in the display unit 504. A button unit 506 includes one or more push buttons or a touch panel sheet disposed on the LCD of the display unit 504. If the CPU 503 detects an operation (pressing down) performed on the button unit 506, the CPU 503 transmits information to the control unit 303 via the host interface 508 to notify that the pressing-down of a button has been detected. The CPU 503 may also transmit information indicating which button has been pressed.

A card reader unit 203 is connected to a card reader interface 502. Under the control of the CPU 503, the card reader unit 203 transmits/receives data to/from a card (such as an ID card) 501.

The respective blocks in the operation unit 204 are connected to an internal bus 505.

In the energy saving mode, the CPU 503 controls the electric power supplied from the power supply unit 302 to the operation unit 204 such that no electric power is supplied to the display unit 504 to reduce power consumption. Alternatively, a back light of the liquid crystal of the display unit 504 may be turned off. In the present embodiment, to reduce power consumption, the processing power of the CPU 503 and the storage capacity of the memory 507 are limited.

A human body detection unit 510 and an antenna 512 have a capability of detecting a human body (or living body) based on a capacitance method. If the human body detection unit 510 detects a user approaching or leaving, the human body detection unit 510 transmits information indicating the detection to the control unit 303 via the host interface 508. Note that electric power is supplied to the human body detection unit 510 even in the energy saving mode.

In the present embodiment, as described above, the human body detection unit 510 is disposed in the operation unit 201. Alternatively, the human body detection unit 510 may be disposed at another location on the MFP 101 as long as it is possible to detect a human body approaching and leaving and transmit a detection result to the control unit 303. The MFP 101 may include a plurality of human body detection units. In particular, in a case where the MFP 101 is of a large size type such as a large-size copying machine, human body detection units may be disposed at a plurality of locations (such as an operation unit, a paper cassette, a paper output unit, etc.) to make it possible to detect a user approaching any part of the MFP 101. In yet another alternative location, the human body detection unit 510 may be located separate from the MFP 101.

Figure 5:
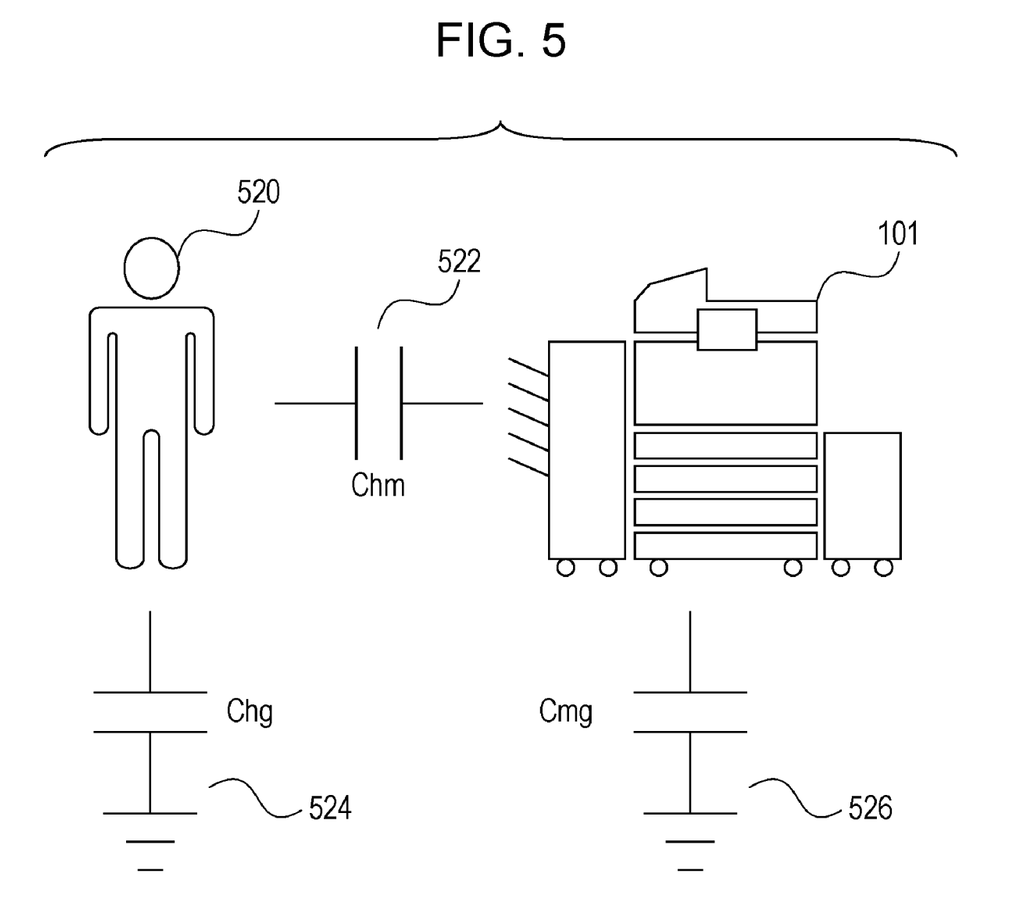
FIG. 5 is a diagram schematically illustrating an operation principle of a human body detection unit based on a capacitance method according to an embodiment of the present invention.

Human Body Detection Unit FIG. 5 is a diagram illustrating in a simplified manner an operational principle of the human body detection unit 510 based on the capacitance method according to the present embodiment. The human body detection unit 510 based on the capacitance method is configured to measure capacitance Chm (522) between the antenna 512 disposed on the MFP 101 and a human body 520. The capacitance Chm (522) varies depending on the distance between the antenna 512 and the human body 520. More precisely, the actual capacitance measured by the antenna 512 is the resultant capacitance C of the capacitance Chm, capacitance Chg (503) between the human body 520 and the ground, and capacitance Cmg (504) between the MFP 101 and the ground. The resultant capacitance C is given by equation (1) shown below.

$$1/C = 1/(Chm+Chg) + 1/Cmg \qquad (1)$$

Because the resultant capacitance Chg and the resultant capacitance Cmg vary depending on an environment in which the MFP 101 is installed, a determination as to whether the human body 520 is approaching the MFP 101 is made based on an evaluation on a relative value with respect to a base noise level. A feature of the human body detection unit 510 based on the capacitance method is in that the distance between the human body 520 and the MFP 101 is relatively detectable as can be seen from equation (1). Besides, the human body detection unit 510 based on the capacitance method needs small power consumption, and thus it is suitable for use in the energy saving mode.

Figure 6:
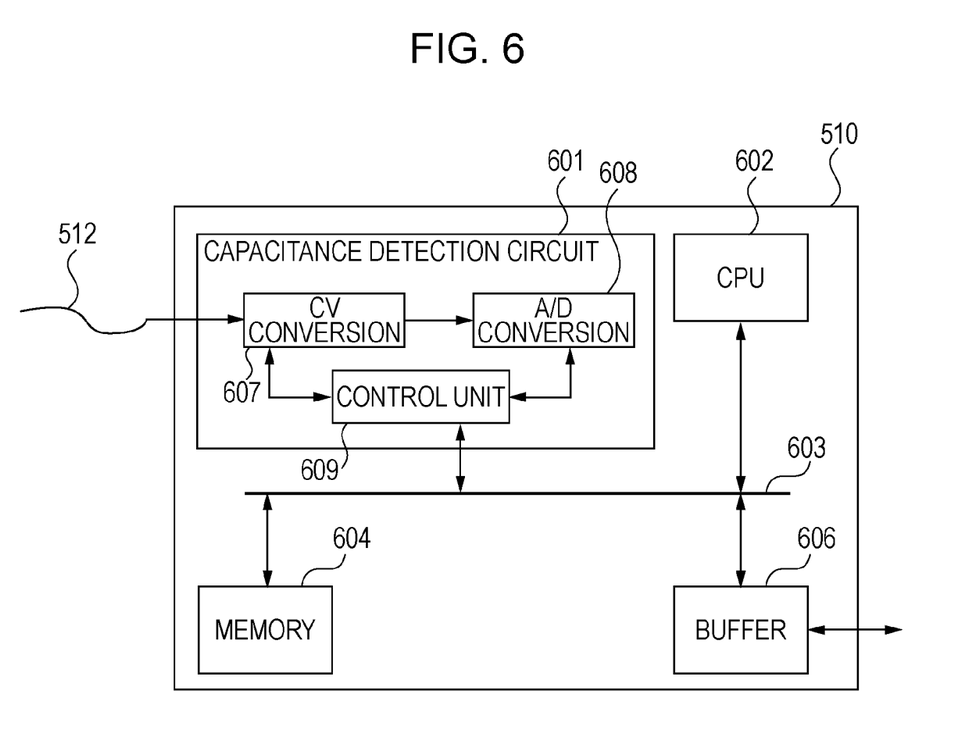
FIG. 6 is a block diagram illustrating an example of a hardware configuration of a human body detection unit.

FIG. 6 is a diagram illustrating an example of a hardware configuration of the human body detection unit 510 according to the present embodiment of the invention. A capacitance detection circuit 601 includes a capacitance-to-voltage converter 607, an analog-to-digital converter 608, and a control unit 609. An antenna 512 is connected to the capacitance-to-voltage converter 607, and the capacitance-to-voltage converter 607 converts the capacitance between the antenna 512 and the ground to a voltage value. The voltage value output from the capacitance-to-voltage converter 607 is converted into a digital value by the analog-to-digital converter 608. In accordance with a command issued by a CPU 602, the control unit 609 controls the capacitance-to-voltage converter 607 and the analog-to-digital converter 608. The CPU 602 reads the resultant digital value and performs processing such as noise removal, a level conversion, etc. The value obtained via the above process is output as a detection strength value (detection output) from the human body detection unit 510. A memory 604 includes a nonvolatile program memory and a rewritable temporary memory. The blocks in the human body detection unit 510 are connected to an internal bus 603. A buffer 606 is for connecting the internal bus 603 of the human body detection unit 510 to the internal bus 405 of the operation unit 104.

Operation of Human Body Detection Unit

Figure 7:
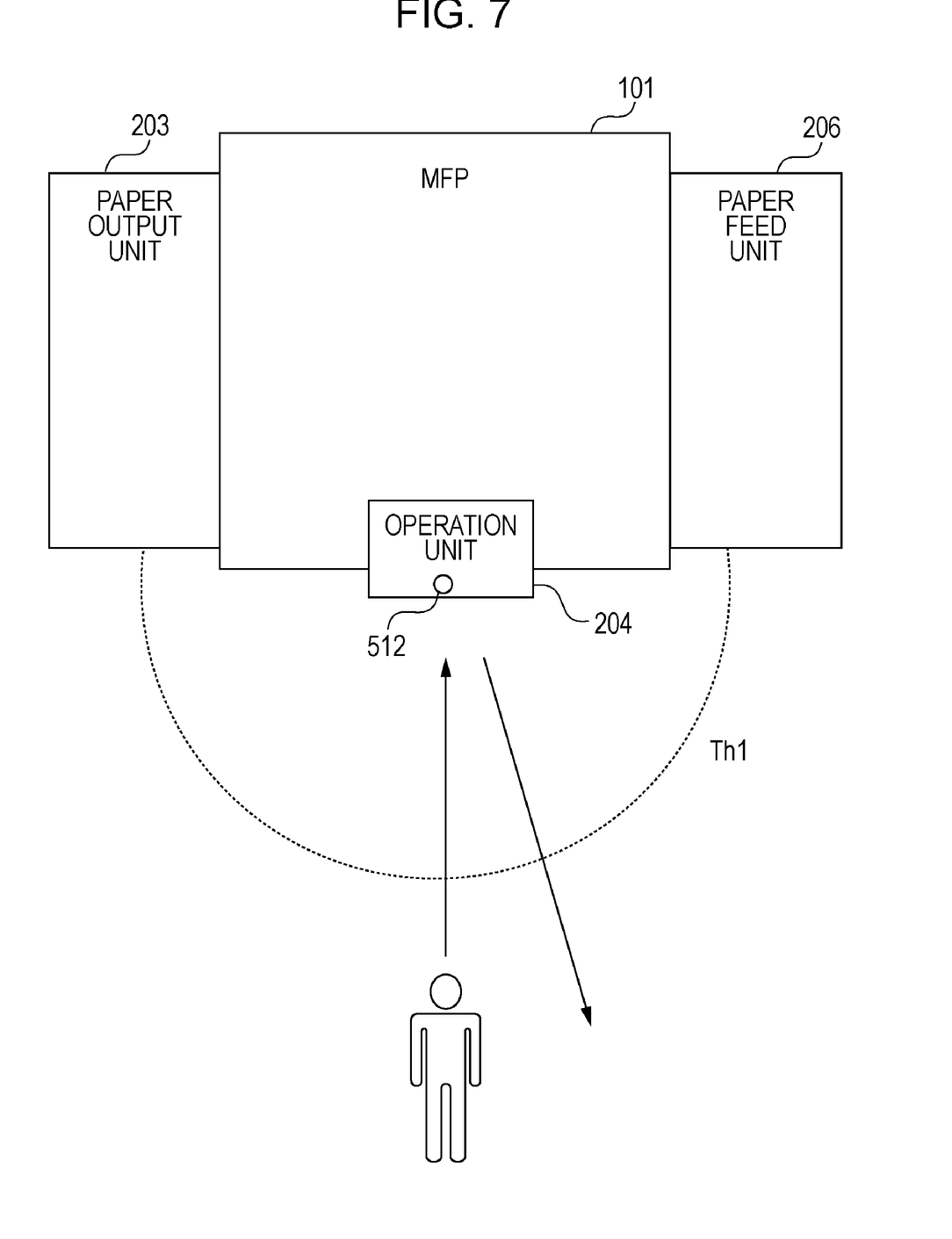
FIG. 7 is a diagram illustrating an example of a movement of a user approaching an image processing apparatus to use it.

FIG. 7 is a diagram illustrating an example of a movement of a user approaching the MFP 101 to use (operate) it. Th1 denotes a threshold value, i.e., a determination reference value, used by the human body detection unit 510 in detecting a human body. The threshold value Th1 may be set in a threshold value calculation process described later or may be set by a user via the operation unit 204. In the case where the threshold value Th1 is set by a user via the operation unit 204, information indicating the specified threshold value Th1 is transmitted to the CPU 602 of the human body detection unit 510 from the operation unit 204 under the control of the control unit 303.

In accordance with the received information, the CPU 602 sets the threshold value Th1. The output from the capacitance detection circuit 601, i.e., the detection strength detected by the human body detection unit 510, is compared by the CPU 602 with the threshold value Th1. If the detection strength is greater than the threshold value Th1, the CPU 602 determines that a human body has been detected. Information indicating the determination result that the human body has been detected is stored in the buffer 606 in the human body detection unit 510 and output to the internal bus 505 of the operation unit 104.

In a case where a user is in a circular area inside Th1, the detection strength is greater than the determination reference value and thus it is determined that a human body is detected. The human body detection unit 510 based on the capacitance method has no directivity, and thus the range within a boundary indicated by Th1 has a circular form (or a spherical form) if it is allowed to neglect influences of parts of the MFP 101 and other apparatuses or objects.

In the present embodiment, the antenna 512 is disposed on the operation unit 204 because a button used by a user to switch the power mode from the energy saving mode into the normal mode is disposed on the operation unit 204. Another reason is that when a user uses the MFP 101, the user is usually located close to the operation unit 204. However, the human body detection unit 510 may be disposed at another location as long as the human body detection unit 510 is capable of detecting a user approaching the operation unit 204.

Figure 8:
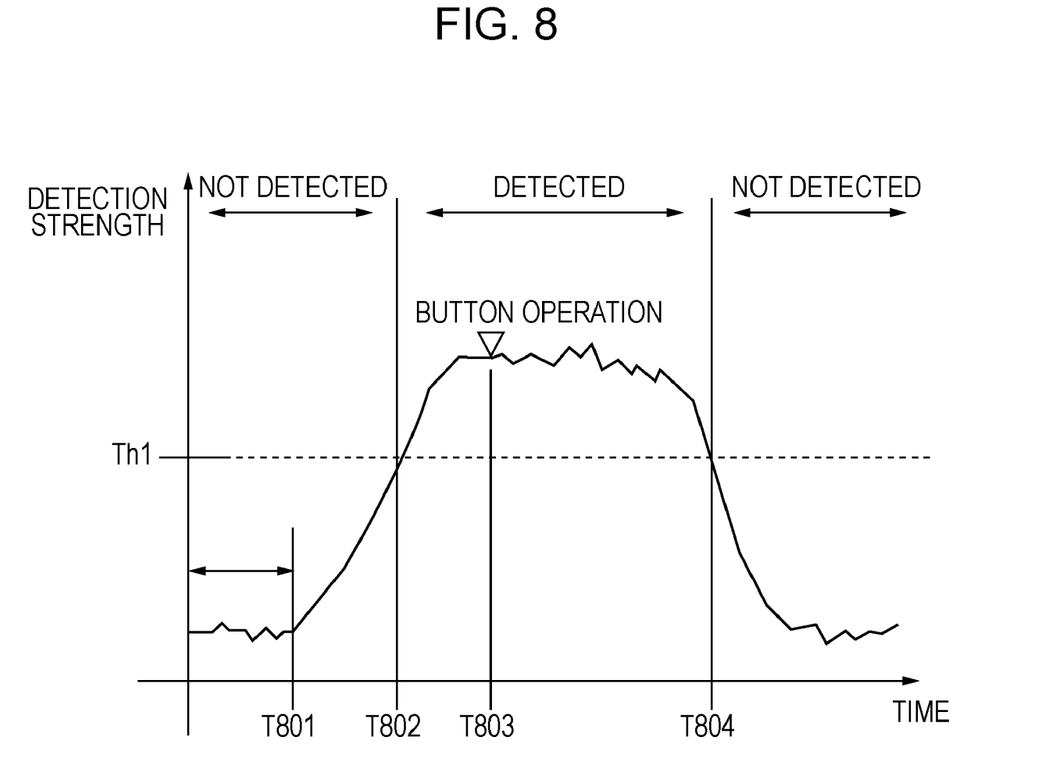
FIG. 8 is a graph illustrating an example of a manner in which the strength of a detection output from a capacitance detection circuit varies with time for a case shown in FIG. 7, and also illustrating a manner in which an operation unit is operated by a user.

FIG. 8 is a graph indicating a manner in which the strength of the detection output from the capacitance detection circuit 601 varies with time for the case shown in FIG. 7. FIG. 8 also shows a manner in which the operation unit 204 is operated by the user. The detection strength of the capacitance detection circuit 601 is output in the form of a digital value from the analog-to-digital converter 608. In a period from an origin of the graph to T801, the user is located far from the MFP 101, and thus the detection strength is at a noise level. As the user approaches MFP 101 in a period following T801, the detection strength gradually increases. When the detection strength exceeds Th1 at T802, it is determined that a human body is detected, i.e., it is determined that the user has come to operate the MFP 101.

At T803, an actual operation of the operation unit 204 is performed by the user. When the detection strength decreases and reaches Th1 at T804, the MFP 101 determines that no human body is detected, i.e., the user has left the MFP 101. Note that the determination as to whether the operation unit 204 is operated can be made by the CPU 503 of the operation unit 204. If the CPU 503 detects that the operation unit 204 is operated, the CPU 503 notifies the CPU 402 of the control unit 303 of the fact that the operation unit 204 has been operated. Operations of the operation unit 204 include pressing-down of a button or a touch panel of the operation unit 204, detecting of a card 501 by the card reader unit 203, setting a document on the reader unit 202, opening/closing of a document pressing plate of the reader unit 202, etc.

A typical example of the operation of the MFP 101 having the human body detection unit 510 based on the capacitance method has been described above. Information indicating that a human body is detected is transmitted at T802 from the human body detection unit 510 to the operation unit 204, and is further transmitted from the operation unit 204 to the CPU 402 and the power supply control unit 401 via the operation unit interface 406. In response to the information received from the operation unit interface 406, the power supply control unit 401 starts supplying electric power to the units in the MFP 101 such that the power mode is switched from the energy saving mode to the normal mode. This makes it possible to start the operation of switching the power mode from the energy saving mode into the normal mode at T802 before the user presses a mode switching button at T803. This results in an improvement in convenience to the user.

Method of Determining Threshold Value

An explanation will now be given as to a method of determining the threshold value of the detection strength of the human body detection unit 510 according to the present embodiment of the invention.

Depending on an environment in which the MFP 101 is installed, there is a possibility that many persons frequently approach the MFP 101 without intention of using the MFP 101. Such a situation can occur, for example, when the MFP 101 is installed in a narrow passage.

Figure 9:
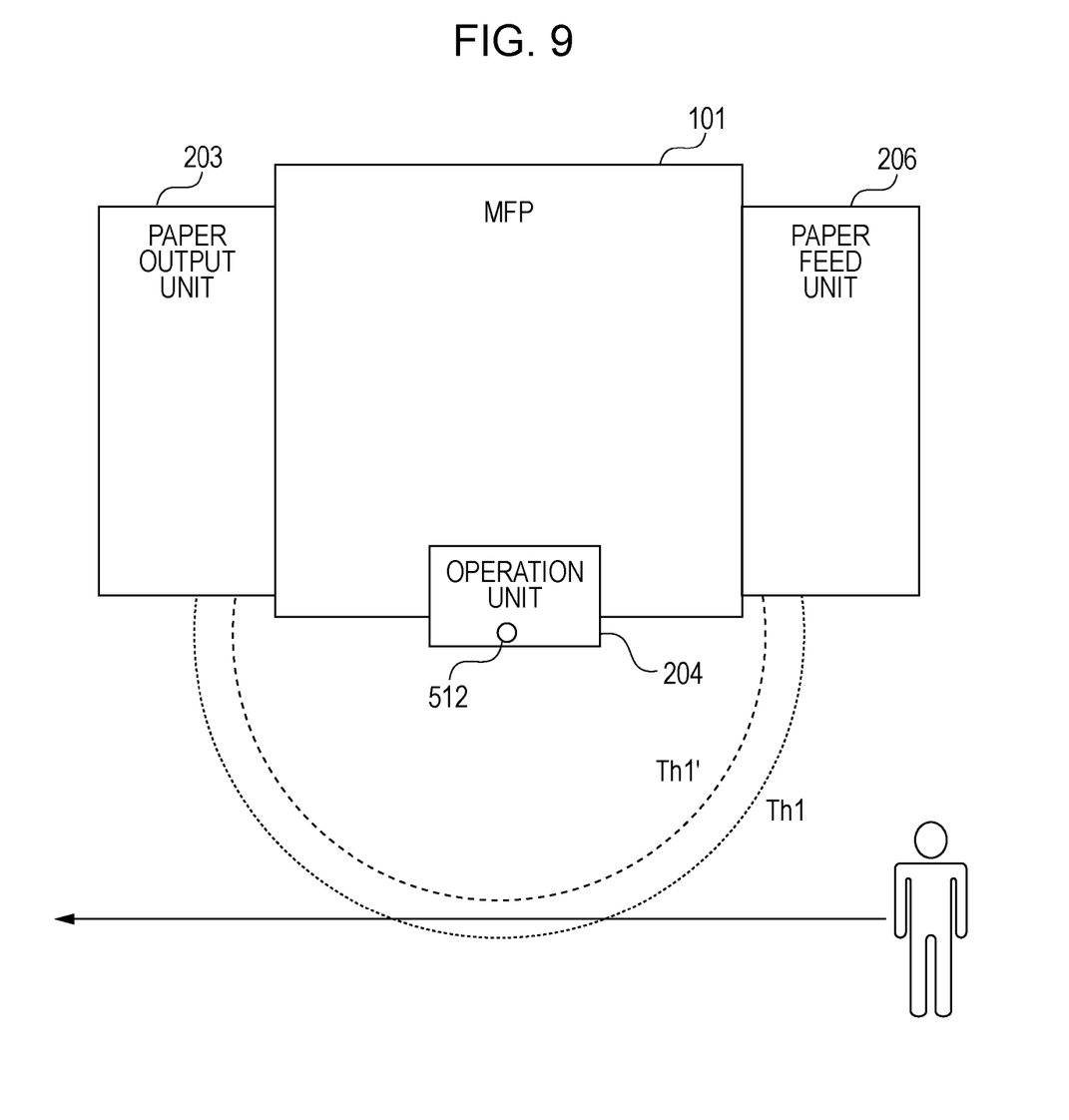
FIG. 9 is a diagram illustrating an example of a manner in which a person passes by an image processing apparatus.

FIG. 9 is a diagram illustrating an example of a manner in which a person passes by the MFP 101. When a person passes by the MFP 101 being in the energy saving mode, a path of the movement of the person can pass through the area in which the detection strength is greater than Th1. Although the person does not have an intention of using the MFP 101, the passing by the MFP 101 can cause the MFP 101 to switch into the normal mode from the energy saving mode in response to the output from the human body detection unit 510. This results in wasteful power consumption and a reduction in the operational life of devices (such as HDD, a relay, fuse, etc.) having an upper limit on the number of times power is turned on.

Figure 10:
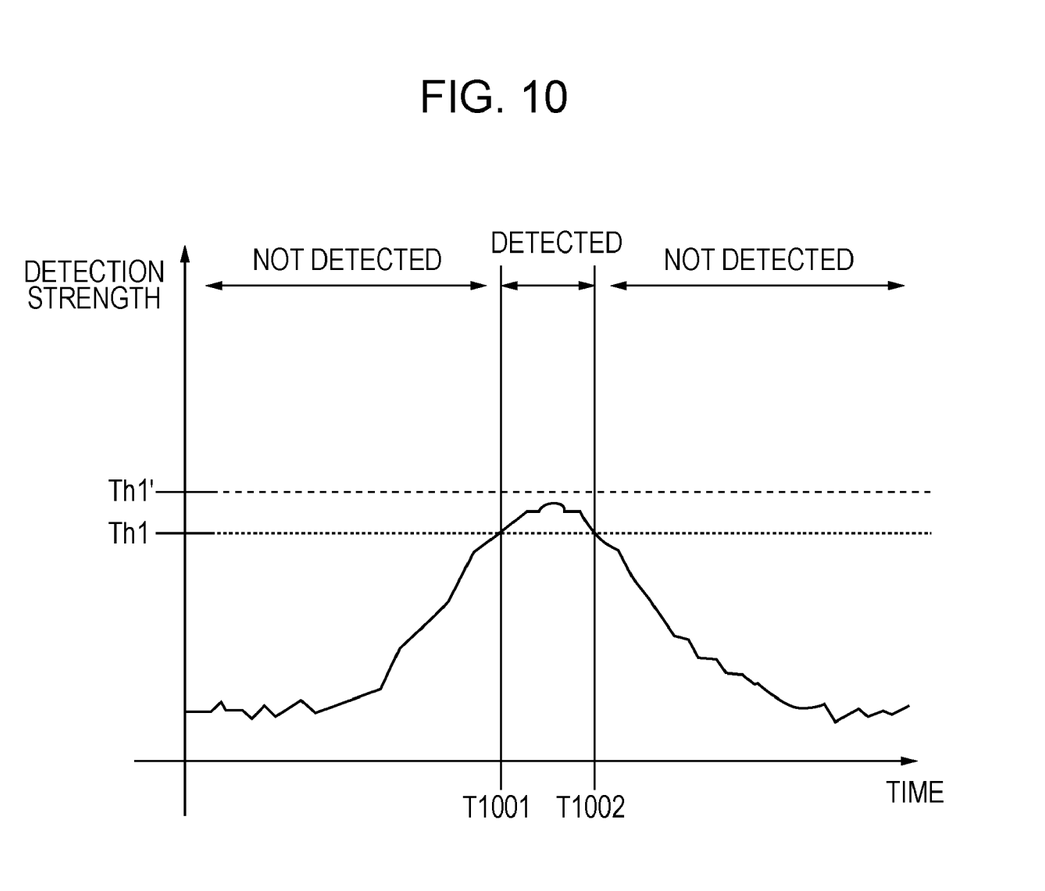
FIG. 10 is a graph illustrating a manner in which the strength of a detection output from a capacitance detection circuit varies with time for a case shown in FIG. 9.

FIG. 10 is a graph illustrating an example of a manner in which the detection strength of the capacitance detection circuit 601 changes with time for a case in which a user passes by the MFP 101 as in FIG. 9. In a state in which the threshold value used in human body detection is set to Th1, if the detection strength exceeds Th1 at T1001, it is determined that a human body is detected, i.e., it is determined that a user has come to operate the MFP 101. However, if no operation on the operation unit 204 occurs thereafter, and if the detection strength decreases down to a level lower than Th1 at T1002, then it is determined that no human body is detected, i.e., it is determined that the user has left the MFP 101. That is, in the case where the threshold value used in human body detection is set to Th1, a person simply passing by is erroneously detected and the MFP 101 switches into the normal mode from the energy saving mode.

In such a case, the MFP 101 changes the threshold value used in human body detection to Th1' greater than Th1 so that the detection strength does not exceed the threshold value Th1' for a person simply passing by the MFP 101 and thus the person simply passing by is not detected and the MFP 101 remains in the energy saving mode.

Figure 11:
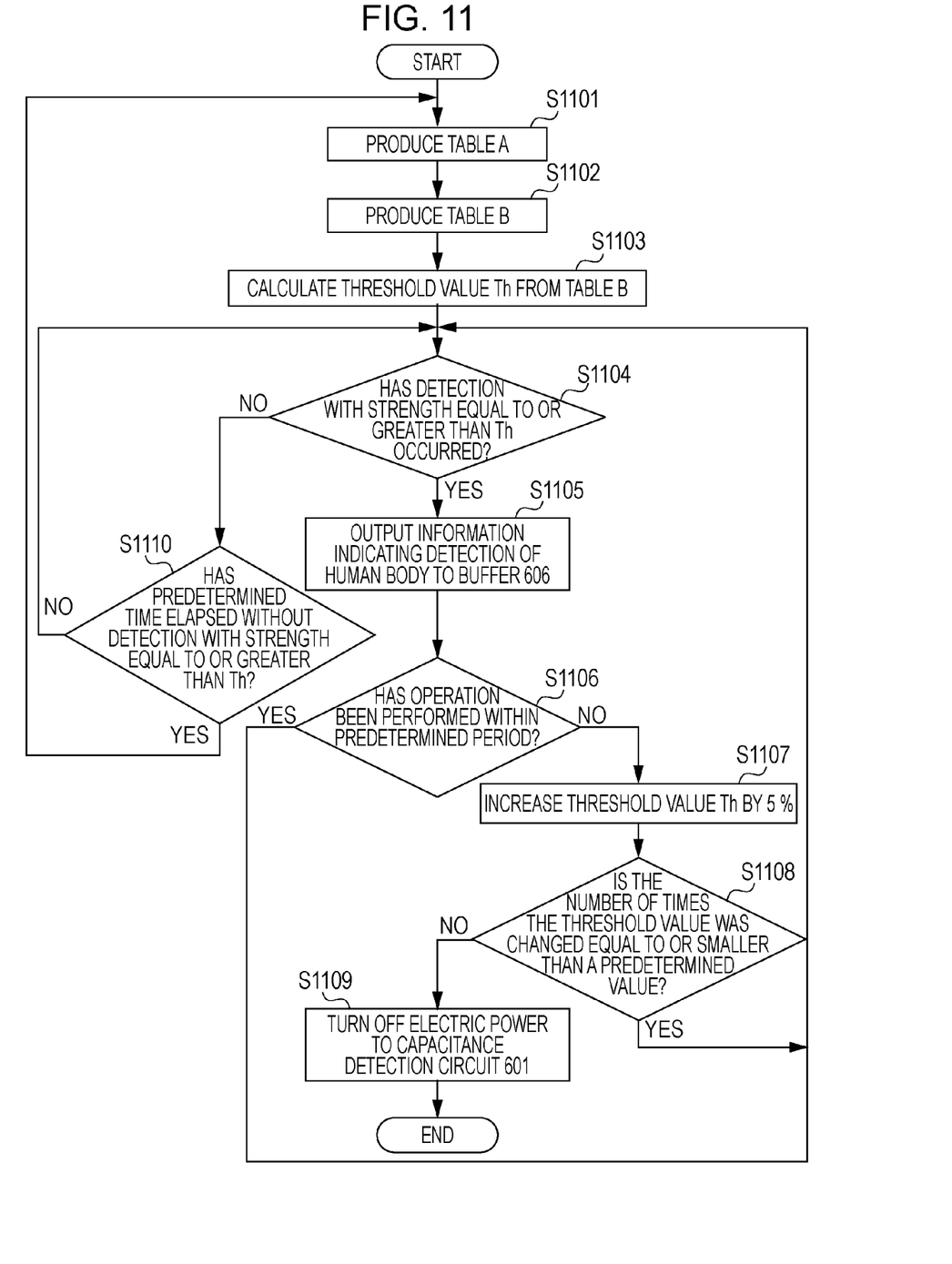
FIG. 11 is a flow chart illustrating an example of a process, performed in an image processing apparatus, to determine a threshold value used in a human body detection.

FIG. 11 is a flow chart illustrating an example of a process, performed in the MFP 101, to determine the threshold value used in human body detection.

In step S1101, the CPU 602 stores sensed values output from the capacitance detection circuit 601 as a history in a nonvolatile storage area of the memory 604 at predetermined intervals according to an internal timer thereby producing a sensed-value table A. For example, the history is recorded every one second to produce the sensed-value table A. Although in the present embodiment the nonvolatile storage area in the memory 604 is used as a history recording area, another storage device other than the memory 604 may be used to record the history.

Figure 12:
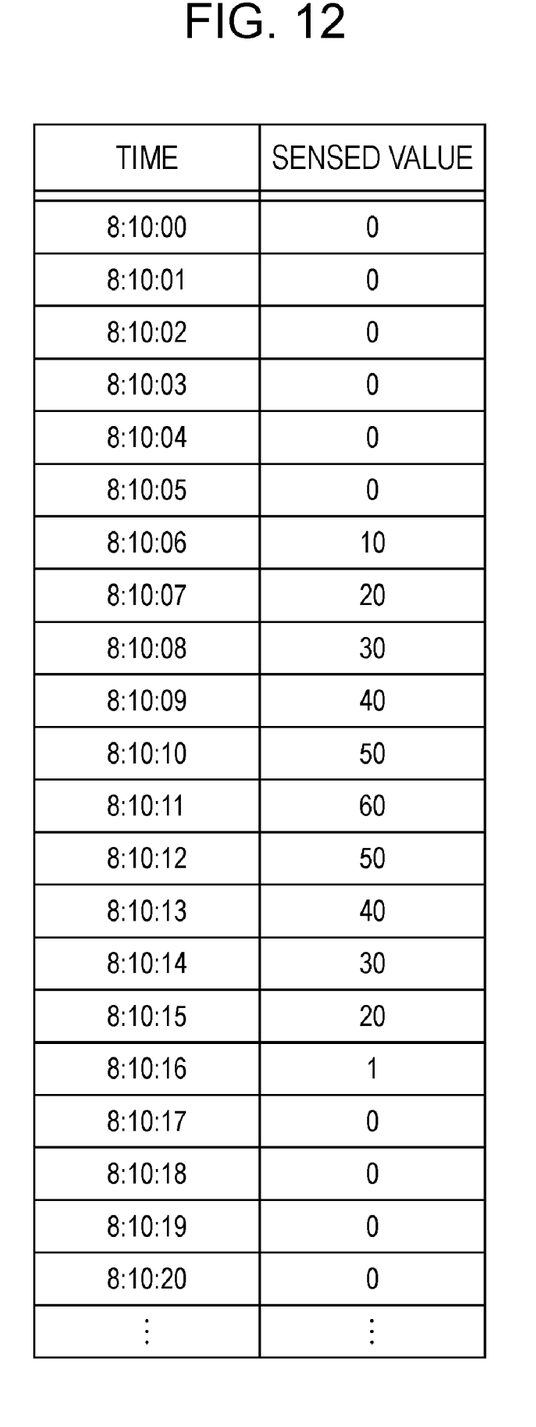
FIG. 12 illustrates an example of a table according to an embodiment of the present invention.

FIG. 12 illustrates an example of table A. Table A includes a column for describing times and a column for describing sensed values. In the example shown in FIG. 12, sensed values are recorded every second. Note that table A is merely an example of a recorded history of the detection output and any format that would allow practice of the present invention is applicable.

Next, in step S1102, the CPU 602 communicates with the CPU 503 that controls the operation unit 204 to acquire information as to whether any operation was performed on the operation unit 204 at times at which the sensed values output from the capacitance detection circuit 601 were recorded. A table B is then produced by merging the acquired information with table A.

Figure 13A:
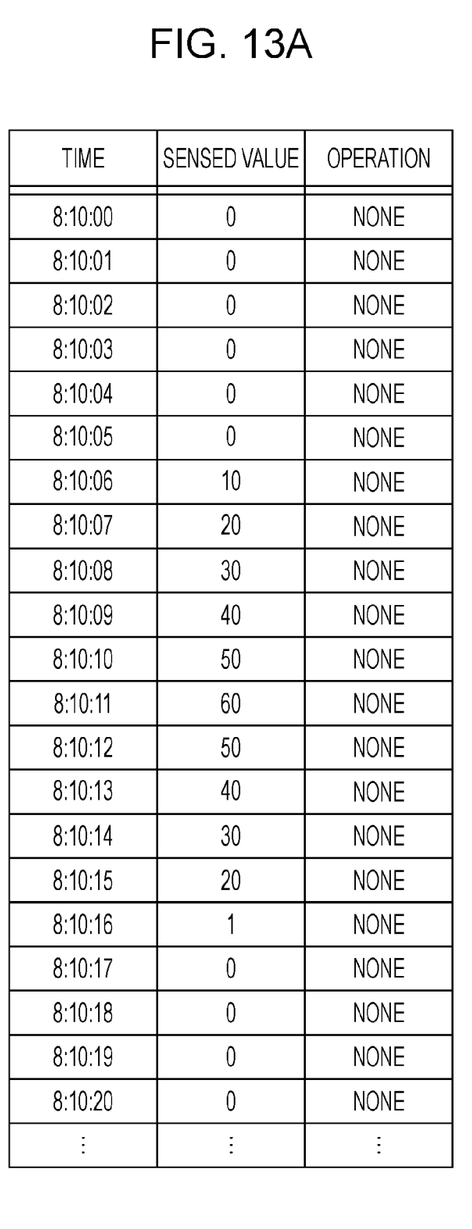
FIG. 13 illustrates an example of a table according to an embodiment of the present invention.
Figure 13B:
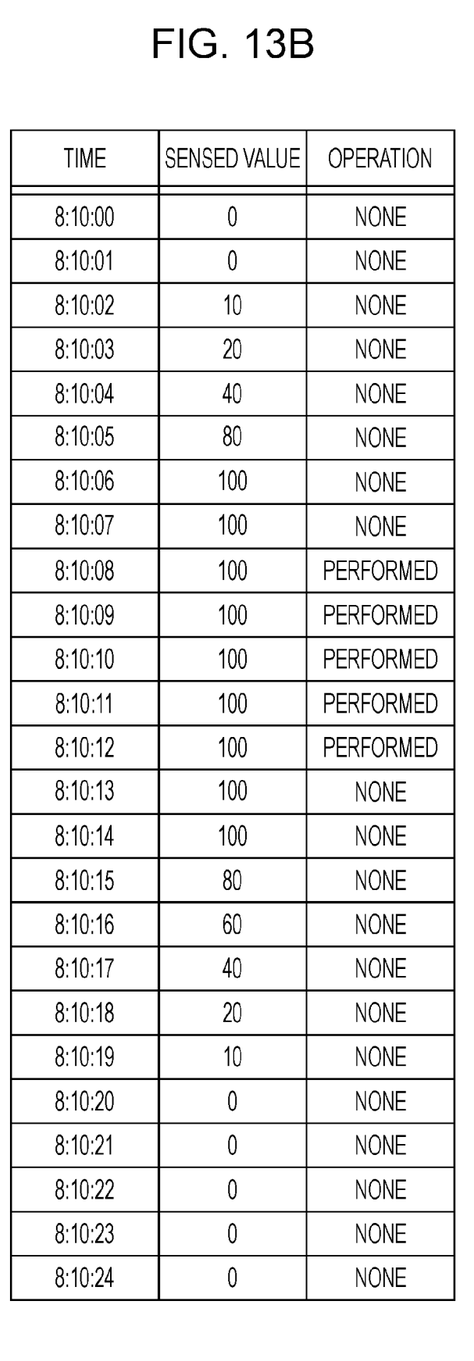

FIG. 13A illustrates an example of table B. As can be seen, in addition to the columns of table A, table B has a column in which operation history information is described to indicate whether an operation was performed on the operation unit 204. FIG. 13B illustrates another example of table B. In this example, the operation history information indicates that operations were performed on the operation unit 204 in a period from 8:10:08 to 8:10:12.

Next, in step S1103, the CPU 602 refers to table B and calculates the threshold value Th for use in human body detection. An example of a calculation method is to determine the mean value of values recorded in table B and employ the value equal to 0.5 times the mean value as the threshold value Th. Alternatively, other statistical methods may be used to determine the threshold value Th. The determined threshold value Th is stored in the memory 604.

In step S1104, the CPU 602 determines whether a sensed value equal to or greater than the threshold value Th associated with the human body detection has been detected. If a sensed value equal to or greater than the threshold value Th has been detected, the process proceeds to step S1105. On the other hand, in a case where no sensed value equal to or greater than the threshold value Th has been detected, the process proceeds to step S1110. In step S1105, information is output to the buffer 606 as to the determination result indicating that the sensed value equal to or greater than the threshold value Th has been detected, i.e., a human body has been detected. The determination result is transferred from the buffer 606 to the CPU 503 via the bus 505 of the operation unit 204.

Thereafter, in step S1106, the CPU 503 determines whether an operation on the operation unit 204 is performed by a user in a predetermined period (for example, 10 seconds) after the reception of the notification from the human body detection unit 510 as to the determination result indicating that the human body was detected. If an operation on the operation unit 204 is detected during the predetermined period, the process returns to step S1104. In this case, the current threshold value Th is adequate to correctly detect a human body, and thus MFP 101 operates using this threshold value Th as a threshold value to detect a human body. On the other hand, in a case where it is determined in step S1106 that no operation on the operation unit 204 is detected in the predetermined period, the process proceeds to step S1107.

In step S1107, the CPU 602 changes the threshold value Th for the human body detection to a value slightly higher than the current value so that a higher minimum detection strength is needed to detect a human body. In the present embodiment, by way of example, the threshold value Th is increased by 5%. Note that the amount of the increase in the threshold value Th is not limited to 5%.

In step S1108, a determination is made as to whether the number of times the process of changing the threshold value Th in S1107 was performed is smaller than a predetermined maximum number (for example, 5 times). If the process has been performed a greater number of times than the predetermined maximum number, the process proceeds to step S1109, but otherwise the process returns to step S1104.

In step S1109, the electric power to the capacitance detection circuit 601 is turned off.

Reasons for turning off electric power to the capacitance detection circuit 601 in step S1109 are as follows. The fact that an erroneous human body detection and a following change in threshold value Th have been performed many times indicates that the MFP is installed in an environment in which the human body detection unit 510 does not function well. For example, in the case where the MFP 101 is installed in a narrow passage, the human body detection unit 510 cannot distinguish between a person who approaches the MFP 101 to use the MFP 101 and a person who simply passes by the MFP 101. In such an installation environment, switching into the normal mode from the energy saving mode occurs whenever a person passes by the MFP 101 without intention of using the MFP 101. This is undesirable not only because of wasteful power consumption but also because of a reduction of the operational life of parts having an upper limit on the number of times power is turned on. Therefore, in such an environment in which a person having no intention of using the MFP 101 is detected frequently, electric power to the capacitance detection circuit 601 is turned off such that the human body detection is disabled to reduce the power consumption.

In step S1109, instead of turning off the electric power to the capacitance detection circuit 601, the MFP 101 may be controlled such that the operation is disabled in terms of switching of the mode from the energy saving mode into the normal mode in response to the detection result of the capacitance detection circuit 601. Alternatively, the detection output from the capacitance detection circuit 601 may be invalidated.

In the embodiment described above, the process proceeds to step S1109 from step S1108 when the threshold value has been changed a greater number of times than the predetermined number. Alternatively, the process may proceed to step S1109 when the threshold value has reached a predetermined value. The process from step S1101 to step S1103 may be performed when the MFP 101 is installed at a new location, and this process may not be performed after the threshold value has once converged to a particular value. To handle a possible situation in which a change occurs in an installation environment after the MFP 101 was installed therein or a change occurs in the installation location, the process from step S1101 may be performed periodically (for example, once a week or month).

In a case where an operation on the operation unit 204 is detected when no sensed value equal to or greater than the threshold value Th is detected in step S1104, the threshold value Th may be reduced such that a smaller minimum detection strength is needed for detection.

As described above, learning is performed based on the history of sensed values in the human body detection and the history of operations of the image forming apparatus, and the range of the detection strength is properly set to correctly detect human bodies thereby reducing the probability that the power mode is erroneously switched from the energy saving mode into the normal mode in response to an erroneous detection while allowing a person approaching the MFP to use the MFP to be detected as quickly as possible thereby providing better convenience to users.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-321648 filed Dec. 17, 2008, which is hereby incorporated by reference herein in its entirety.

What is claimed is:

1. An image processing apparatus comprising:
a living body detection unit configured to detect approaching of a living body based on a detection output depending on a distance to the living body;
an operation unit configured to receive an operation command from a user;
a history recording unit configured to record a history of a detection output of the living body detection unit and a history of an operation performed on the operation unit; and
a determination unit configured to determine a threshold value of the detection output,
wherein the threshold value is used by the living body detection unit as a determination reference value in determining whether a living body is detected,
wherein determination of the threshold value is based on the history recorded in the history recording unit as to the detection output of the living body detection unit and as to the operation performed on the operation unit.

2. The image processing apparatus according to claim 1, further comprising a power supply unit capable of supplying electric power to a plurality of units of the image processing apparatus, the power supply unit having a first power mode in which electric power is supplied to the plurality of units and a second power mode in which the power supply unit supplies smaller electric power than that in the first power mode,
wherein the power supply unit supplies electric power to the living body detection unit in the second power mode, and
the power supply unit switches the second power mode into the first power mode when the living body detection unit detects a living body approaching the image processing apparatus in the second power mode.

3. The image processing apparatus according to claim 2, further comprising a device having an operational life depending on the number of times electric power is turned on,
wherein the power supply unit supplies electric power to the device in the first power mode and not in the second power mode.

4. The image processing apparatus according to claim 1, further comprising a changing unit configured to change the threshold value determined by the determination unit such that if the operation unit receives no operation command within the predetermined period after the living body detection unit detects a living body approaching the image processing apparatus based on the threshold value determined by the determination unit, then the threshold value determined by the determination unit is changed to a value such that a living body is detected when the living body comes to a location closer to the image processing apparatus.

5. The image processing apparatus according to claim 4, further comprising a disabling unit configured to disable the living body detection unit when the threshold value has been changed by the changing unit a greater number of times than a predetermined number.

6. The image processing apparatus according to claim 5 further comprising a power supply unit configured to supply electric power to a plurality of units of the image processing apparatus,
wherein the disabling unit disables the living body detection unit by stopping supply of electric power from the power supply unit to the living body detection unit.

7. The image processing apparatus according to claim 1, wherein the living body detection unit provides the detection output depending on the distance to the living body by measuring the capacitance between the living body and an antenna connected to the living body detection unit.

8. A method of controlling an image processing apparatus including a living body detection unit configured to detect approaching of a living body based on a detection output depending on a distance to the living body, and an operation unit configured to receive an operation command from a user, the method comprising:
recording a history of a detection output of the living body detection unit and a history of an operation performed on the operation unit; and
determining a threshold value of the detection output, the threshold value being used by the living body detection unit as a determination reference value in determining whether a living body is detected, the determination of the threshold value being made based on the recorded history as to the detection output of the living body detection unit and as to the operation performed on the operation unit.

9. A storage medium storing a program for controlling an image processing apparatus including a living body detection unit configured to detect approaching of a living body based on a detection output depending on a distance to the living body, and an operation unit configured to receive an operation command from a user, the program comprising:
recording a history of a detection output of the living body detection unit and a history of an operation performed on the operation unit; and
determining a threshold value of the detection output, the threshold value being used by the living body detection unit as a determination reference value in determining whether a living body is detected, the determination of the threshold value being made based on the recorded history as to the detection output of the living body detection unit and as to the operation performed on the operation unit.

* * * * *